(No Model.)
E. P. NEWBANKS.
FEED TROUGH.
No. 379,489. Patented Mar. 13, 1888.
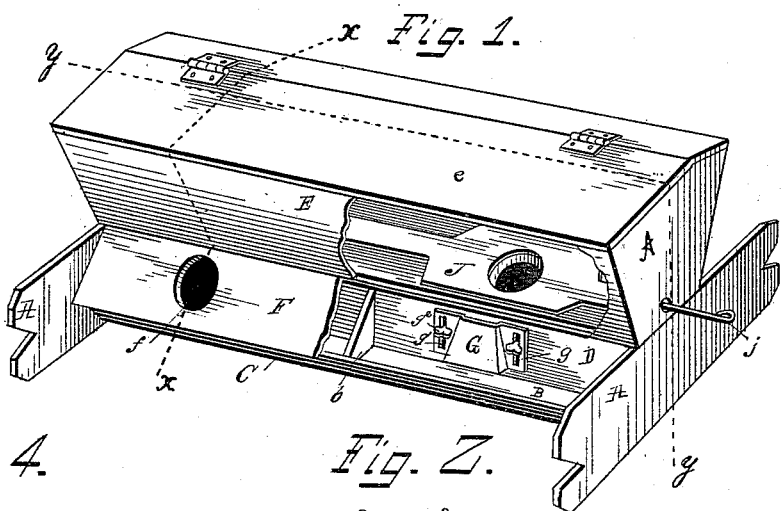
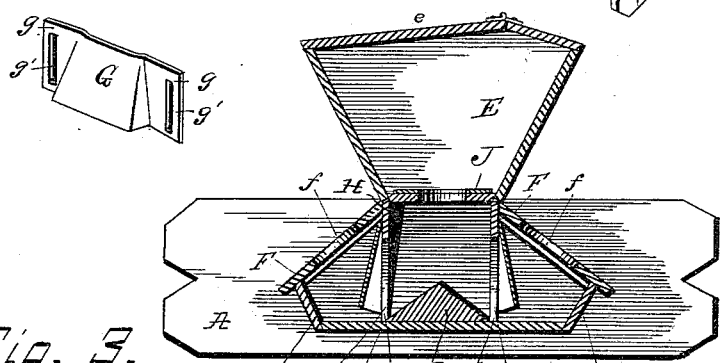
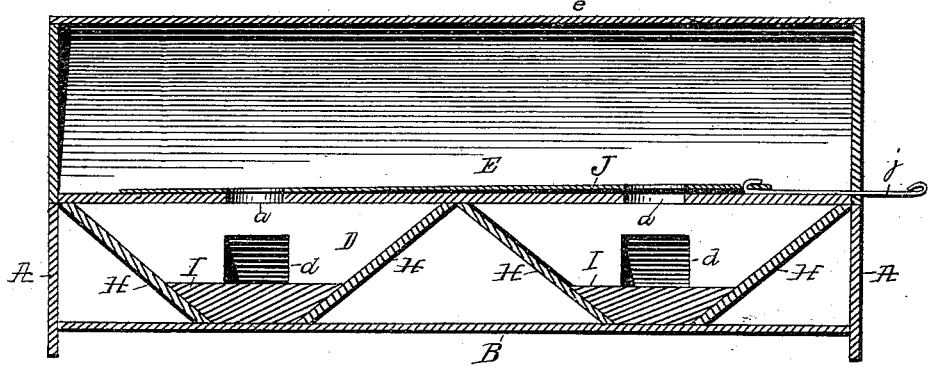
Witnesses
M. A. Barnes.
Van Buren Hillyard.
Inventor.
Eli P. Newbanks.
By R. S. & A. P. Lacey
Attys.

UNITED STATES PATENT OFFICE.

ELI P. NEWBANKS, OF BELOIT, KANSAS, ASSIGNOR OF ONE-HALF TO JOHN MAHAFFA, OF SAME PLACE.

FEED-TROUGH.

SPECIFICATION forming part of Letters Patent No. 379,489, dated March 13, 1888.

Application filed October 19, 1887. Serial No. 252,811. (No model.)

*To all whom it may concern:*

Be it known that I, ELI P. NEWBANKS, a citizen of the United States, residing at Beloit, in the county of Mitchell and State of Kansas, have invented certain new and useful Improvements in Feed-Troughs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to feed-troughs for stock, and has for its object the production of a feed-trough which will prevent the feed being wasted and will prevent the lodgment of the feed in the intermediate receptacle between the trough and the hopper.

The improvements consist in the novel construction and combination of parts, which will be more fully hereinafter set forth and claimed, and shown in the annexed drawings, in which—

Figure 1 is a perspective view, parts being broken away, of a feed-trough embodying my invention; Fig. 2, a cross-section on the line X X of Fig. 1; Fig. 3, a longitudinal view on the line Y Y of Fig. 1, and Fig. 4 a perspective view of the hood or guard.

The trough, composed of end pieces, A, bottom B, and sides C, which incline outwardly, has longitudinal partitions D D, parallel to each other and with the edges of the bottom B and extending between the end pieces, to which they are secured at their ends. Upon these longitudinal partitions D D is placed the hopper E, having a hinged cover, $e$. The bottom of the hopper, having openings $a$, rests upon the edges of the partitions D and upon the edges of the end pieces, A.

The feeding-troughs formed between the partitions D and the sides C are divided by the plates $b$ into a series of compartments, and are closed by the covers or tops F, which have openings $f$, through which the animals feed. The openings $d$, formed in the lower edges of partitions D, and which allow the feed to escape into the compartments of the troughs, are provided with a hood or guard, G, having wings $g$, which are vertically slotted, and through which slots $g'$ the set-screws $g^2$ pass for adjustably securing the guards to the partitions for regulating the amount of feed that shall stand in the trough and preventing the animal wasting any of the feed. The guard and wings are made of a single piece of sheet material having its central portion pressed out and inclining from the top edge of the piece to its lower edge, so that the feed will have ample room to escape into the trough.

The space between the two longitudinal partitions D D is divided up by the plates H, which incline in opposite directions from the openings $d$ to the bottom of the hopper, and by the oppositely-inclined blocks I, located opposite the openings $d$, so that no projecting ledge is offered for the lodgment of the feed.

The feed is placed in the hopper and may be prevented from escaping through the openings in its bottom by the slide or cut-off J, which rests upon the said bottom of the hopper and is adapted to be moved by the rod $j$ for regulating the discharge of feed, which, falling upon the inclined sides of the block I, is directed through the opening $d$ into the trough. The space between the bottom B and the lower edge of the guards or hoods can be regulated to suit the amount of grain desired to be discharged into the trough.

Having thus described my invention, what I claim, and desire to secure by Letters Patent, is—

1. The herein shown and described feed-trough, composed of the end pieces, A, bottom B, sides C, longitudinal partitions D, arranged at a distance apart and parallel with the edges of the bottom B and having notches or openings in their lower edges, the hoods or guards placed over said openings, the inclined plates H, the oppositely-inclined blocks I, the hopper having openings in its bottom, and the slide or cut-off for regulating the size of the openings in the bottom of the hopper, substantially as shown and described.

2. The combination, with the trough and the partition having an opening, of the guard placed over the said opening, composed of a central portion and side wings, the central portion inclining from top to bottom and the wings having vertical slots, and the set-screws passing through the slots in the wings of the guard, substantially as and for the purpose specified.

In testimony whereof I affix my signature in presence of two witnesses.

ELI P. NEWBANKS.

Witnesses:
　A. G. MEAD,
　O. H. ROBINSON.